United States Patent [19]

Isheim

[11] 4,153,411

[45] May 8, 1979

[54] ROTARY SLUDGE DRYING SYSTEM WITH SAND RECYCLE

[75] Inventor: Maynard C. Isheim, Menlo Park, Calif.

[73] Assignee: Envirotech Corporation, Menlo Park, Calif.

[21] Appl. No.: 895,684

[22] Filed: Apr. 12, 1978

[51] Int. Cl.² ............................................. F27B 15/00
[52] U.S. Cl. ..................................... 432/27; 110/238; 110/246; 432/30; 432/197
[58] Field of Search ...................... 432/27, 28, 30, 197; 110/221, 238, 246

[56] References Cited

U.S. PATENT DOCUMENTS

| 2,754,105 | 7/1956 | Pistorius et al. | 432/28 |
| 3,848,548 | 11/1974 | Bolejack, Jr. et al. | 110/246 |

Primary Examiner—John J. Camby
Attorney, Agent, or Firm—Hal J. Bohner; Robert E. Krebs

[57] ABSTRACT

A process and system to dry wet sewage sludge with hot sand and to burn the dried sludge. The sand is heated in a sand heater by burning dried sludge, and the hot sand is transferred to a sludge dryer. Wet sludge is mixed with the hot sand in the sludge dryer and thereby moisture is driven off. The dried sludge and sand are separated, and the sand returned to a sand heater while the dried sludge is burned to heat the sand.

8 Claims, 2 Drawing Figures

ROTARY SLUDGE DRYING SYSTEM WITH SAND RECYCLE

BACKGROUND OF THE INVENTION

1. Field of the Invention

This invention relates to the drying and burning of waste materials such as sewage sludge.

2. State of the Art

Conventional wastewater treatment processes remove pollutants from the wastewater and generate slurries of the removed pollutants. These slurries are generally known as sludge, which generally contains organic materials as well as a high percentage of water. Disposal of the sludge is accomplished by known methods, and one such method includes dewatering the sludge by filtration and incineration of the dewatered sludge.

It is generally recognized that filtration of sludge removes only a fraction of the water, and substantial quantities of water remain with the sludge even after filtration. Therefore, it is desirable to remove additional water from the sludge prior to incineration so that it is not necessary to heat substantial quantities of water in the incineration step.

One conventional process for removing additional water from filtered sludge includes heating the sludge prior to incineration. In a dryer, the sludge is contacted with hot combustion gases from the incineration step so that the sludge is heated and water is driven off as vapor. When the sludge is heated, malodorous gases as well as water evolve from the drying sludge and they are also carried from the dryer by the combustion gases. These gases are then passed through a condensor wherein the water vapor condenses and is disposed of, and the dry, malodorous gas is returned to the incinerator to be burned.

It should be appreciated that a gas has a relatively low heat capacity, and therefore large quantities of the combustion gas must be contacted with the sludge in order to effectively heat and dry it. Moreover, a large dryer and condenser are also necessary to handle the large volumes of gas.

OBJECTS OF THE INVENTION

An object of the present invention is to provide a process and system to dry sludge and like materials while minimizing the quantity of gases which must be treated. Another object is to provide a process and system whereby the quantity of fuel required to dry the sludge is minimized.

Further objects and advantages of the present invention can be readily ascertained by reference to the following description and drawings, which are offered by way of example only and not in limitation of the invention, the scope of which is defined by the appended claims and by equivalents to the structure, materials, and acts set forth hereinafter.

DETAILED DESCRIPTION OF THE PREFERRED EMBODIMENT

Figure 1:
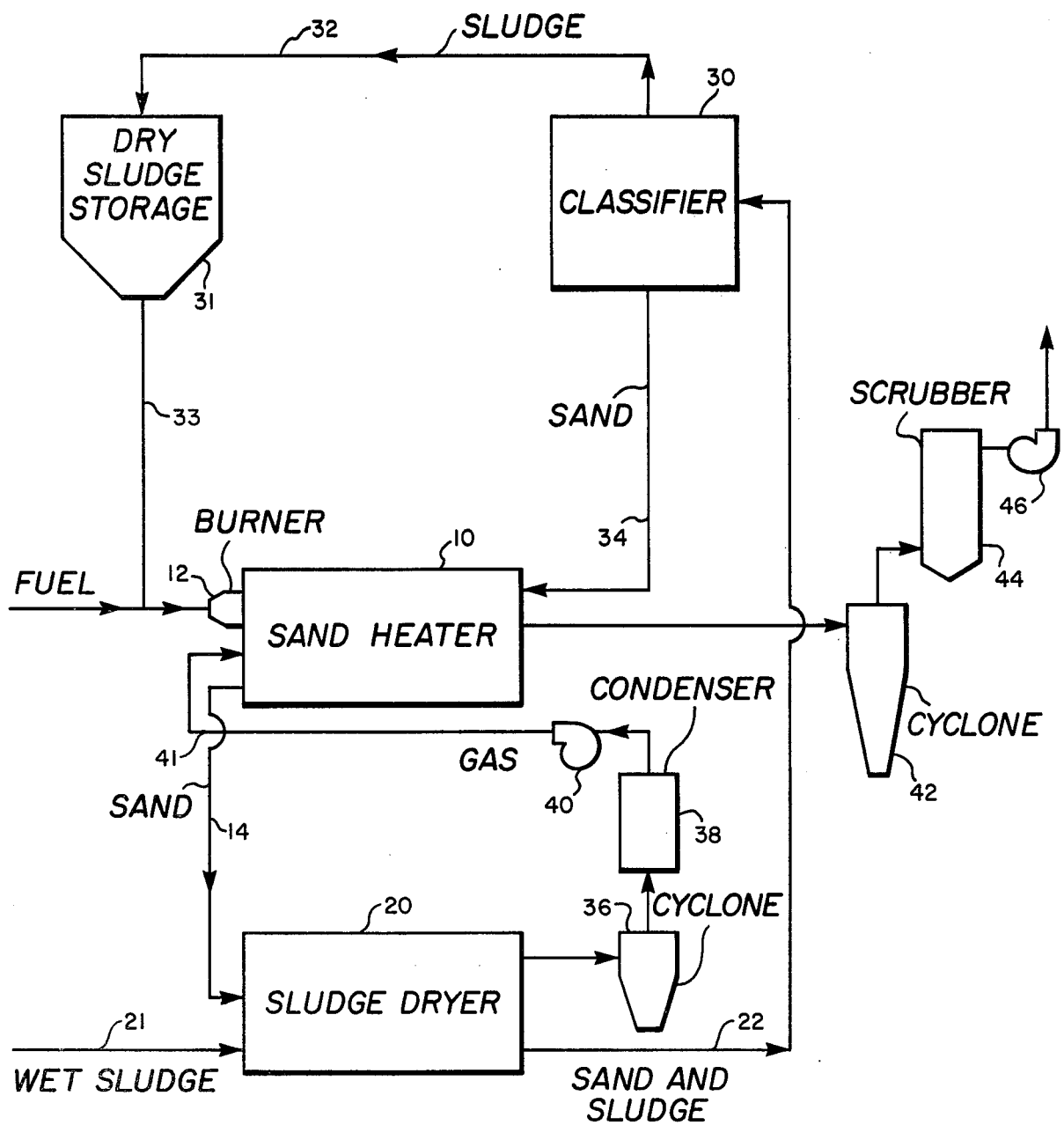
FIG. 1 is a schematic representation of one embodiment of the present system.

The system shown in FIG. 1 includes a sand heater 10 which is preferably a conventional rotary countercurrent dryer-kiln. This dryer-kiln includes a substantially horizontally disposed, rotatable, cylindrical vessel having an inlet at one end and an outlet at the other. A plurality of baffles are located within the vessel parallel to its axis, and the vessel is inclined slightly with the lower end at the outlet so that when the vessel is rotated, material inside cascades as it moves from the inlet to the outlet end. It should be appreciated that other conventional devices, such as a multiple hearth furnace, could also be used as the sand heater 10.

A conventional burner 12 is connected to the outlet end of the sand heater 10 so that the flow of heat from the burner 12 is countercurrent to the flow of sand. The burner 12 is of the type designed to burn either a solid material in powdered form or a solid and liquid fuel mixture. For example the burner can be a HYDROFIRE ™ burner manufactured by the BSP Division of Envirotech Corporation. It should be appreciated that the burner 12 can, alternatively, be a small rotary kiln of conventional construction.

A line 14 is affixed to the outlet end of the sand heater 10 to carry heated sand to a sludge dryer 20. The sludge dryer 20 is similar to the sand heater 10, but the dryer 20 includes no burner means. The dryer 20 receives wet sludge via line 21 at the inlet end of the device along with incoming sand, and the sludge and sand are mixed while they flow toward the outlet end of the dryer 20.

After the sand and sludge are mixed in the dryer 20, the mixture is removed via line 22 and transferred to classifier 30. The classifier 30 is a known device such as a screening device or an air classifier or a cyclone centrifuge, which utilize the difference in particle size or in specific gravity between two materials to accomplish separation of the materials. From the classifier 30 the sludge is transferred to a sludge storage container 31 via line 32, and the sand is returned to the sand heater 10 via line 34.

Gas and water vapor evolved from the sludge in the dryer 20, along with some light sludge particles carried by the gas, are transferred to a cyclone 36, which is a conventional means for separating solid particles from a gas stream. The sludge particles removed from the gas stream by the cyclone 36 can be transferred to the sludge storage container 31 or disposed of. The gas from the cyclone 36 is transferred to a conventional condenser 38 wherein a substantial part of the water vapor is removed from the gas, for example, by spraying cold water through the condenser to cause condensation of the water vapor. After the water vapor has been removed, the substantially dry combustion gas is conveyed via blower 40 and line 41 to the combustion zone of the burner 12 to be burned therein.

The products of combustion generated by the burner 12 in the sand heater 10, along with some light particles, are conveyed to a cyclone 42 wherein the particles are removed and disposed of. The substantially particle-free gases leaving the cyclone 42 are transferred to a conventional scrubber 44. In the scrubber 44 a spray of water or other known scrubbing liquid is directed into the gas stream to collect particles which were not removed by the cyclone 42. Alternatively a conventional dry-type particle collection means such as a bag house can be employed. A blower 46 or the like is connected to the gas outlet of the scrubber 44 to pull the gas through the system.

In operation of the present system sand is continuously fed into the sand heater 10, and fuel such as oil or gas is burned in the burner 12. The heater 10 is rotated so that the sand cascades through the hot gas from the burner 12, and the sand is heated as it travels to the outlet end of the heater 10. In practice the sand is heated to about 800°–1200° F. and is then discharged to the sludge dryer 20.

While the hot sand flows into the sludge dryer 20, wet sludge is introduced via line 21. The sludge dryer 20 is rotated so that the sludge and sand are mixed, and the sand gives up its heat to evaporate a substantial part of the water from the sludge. In practice the sludge introduced into the dryer has a high moisture content, for example, about 75% water. However, wet sludge having more or less water by weight can also be treated. The sludge leaving the dryer 20 has a low moisture content, for example, about 5% water and has a temperature of, say 200° F. However, it should be recognized that the moisture content and temperature of the dried sludge can be varied depending upon various parameters such as the time of contact between the sand and sludge and the ratio of sand to sludge in the dryer 20.

A small amount of ambient, purge air is drawn by blower 40 through the dryer 20 to convey the gases from the drying sludge to the combustion zone of the burner 12 in the sand heater 10. It should be appreciated that these gases contain a substantial quantity of water vapor and also malodrous gases from the sludge. In the condenser a substantial part of the water vapor is condensed so that it can be disposed of, and the malodorous gases, which are combustible, are transferred to the sand heater where they are burned.

The dry sludge and sand mixture is removed from the sludge dryer 20 and conveyed to the classifier 30. The sand used in the present process is chosen with a grain size substantially different from the dry sludge particles, and the classifier generally can separate particles on the basis of size or specific gravity to effect a substantially complete separation of the sludge from the sand. The sand from the classifier 30 is transferred to the sand heater 10, and the sludge is transferred to the storage container 31.

From the storage container 31 the sludge is sent to the burner 12 to be burned. It should be understood that the sludge can be mixed with a fluid fuel for burning. For example, it can be mixed with oil or gas or waste grease. Alternatively, the sludge can be burned uncombined with any fluid fuel.

If all of the sludge is not utilized in the burner, any remaining sludge can be used as humus or fertlizer. For example, it is believed that when the sludge introduced into the dryer 20 contains about 72–78% moisture, it is not necessary to burn all the dry sludge in the burner 12. Under such circumstances about 10–25% of the dry sludge is available to be used as humus or fertilizer. If fluid fuel is burned with the sludge, an even larger percentage of the dry sludge will be available as humus or fertilizer.

Generally, unless the temperature is in excess of about 1000° F. the the malodorous gases introduced through line 41 are not substantially burned and deodorized. Therefore, the temperature in the sand heater 10 is generally maintained above 1000° F. in the combustion zone of the burner 12. The system is preferably designed so that the temperature near the sand inlet end of the heater 10 is substantially lower than 1000° F., and the gas leaving the heater 10 is at a relatively low temperature, say about 200° F. Thus it can be appreciated that the sand and malodorous gases can be heated to relatively high temperaute while insuring that the gas discharged from the heater 10 need not be a high temperature. In other words, the majority of the heat from the burning sludge is usefully transferred to the sand and combustion of the malodorous gases.

Figure 2:
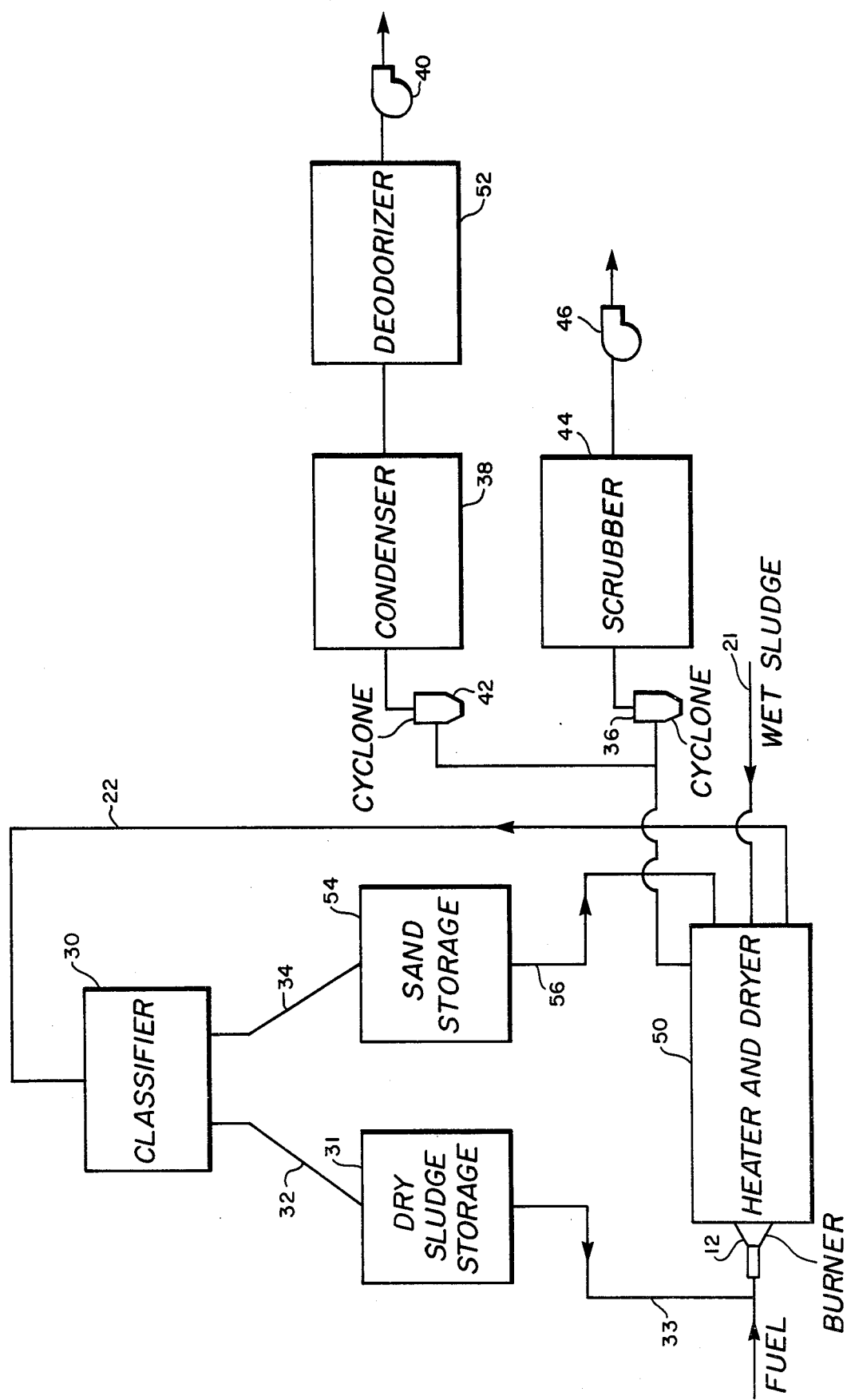
FIG. 2 is a schematic representation of another embodiment of the present system.

Referring now to FIG. 2, there is illustrated another embodiment of the present system. In this embodiment, many of the elements of the system are the same as those in the FIG. 1 system, and like elements are numbered the same. The FIG. 2 system, however does not include a sludge dryer 20 or a sand heater 10, but rather it includes a single heater-dryer 50. The heater-dryer 50 is a dryer-kiln similar in structure to the heater 10 and the dryer 20. However, the heater-dryer 50 is disposed horizontally and has its inlet and outlet located at the same end of the cylinder. The heater-dryer 50 contains a plurality of angularly-disposed baffles located so that when the heater-dryer 50 rotates in one direction the material therein flows from the inlet toward the burner 12, and when it rotates in the other direction the material flows from the burner toward the outlet.

The operation of the FIG. 2 system is batch-wise, rather than continuous as the FIG. 1 system. Initially the heater-dryer 50 is filled with a charge of sand, and a suitable fuel is burned in the burner 12 to heat the sand to a predetermined temperature. The products of combustion are pulled from the heater-dryer 50 by blower 46, and the cyclone 36 and scrubber 44 remove particles and offensive gases from the gas stream.

Thereafter the blower 46 is shut off, and wet sludge is introduced into the heater-dryer 50 which is rotated to mix the hot sand and sludge and cause the mixture to flow toward the outlet end of the heater-dryer 50.

A small quantity of purge air is pulled by blower 40 through the heater-dryer 50 to carry water vapor from the drying sludge. The gas is passed through the condenser 38 to remove the water vapor and thereafter through a conventional deodorizer 52 wherein the malodorous constituents of the dry gas are removed. The deodorizer 52 can be, for example, a carbon column or a permanganate scrubber, both of which are conventional.

After the sludge has been dried the sludge and sand mixture is transferred via line 22 to the classifier 30 for separation. From the classifier 30 dry sludge is transferred to the sludge storage container 31, and sand is transferred to a sand storage container 54. Thereafter the sand is transferred to the heater-dryer 50, and the dry sludge is burned in burner 12 either alone or mixed with suitable fuel. Gaseous products of combustion of the sludge are carried from the heater-dryer 50 by action of the blower 46, and particles entrained in the gas are removed by the cyclone 36 and scrubber 44. The sand is thereby heated and thereafter the process discussed above is repeated.

It should be appreciated that although specific devices have been discussed above, other similar defices can be substituted therefor in accordance with conventional practice. It should also be appreciated that granular materials other than sand could also be utilized as a heat-transfer medium.

I claim:

1. A system to dry wet sludge with granular material and to burn dry sludge comprising:

a. heating means to heat the granular material;
b. burner means coupled to said heating means to burn sludge to heat the granular material;
c. sludge drying means coupled to receive hot granular material from said heating means and to mix the hot granular material with the wet sludge to dry the wet sludge;
d. classifier means coupled to receive granular material and dry sludge from said sludge drying means and to separate the granular material from the dry sludge;
e. transfer means coupled to said classifier and to said burner means to convey the dry sludge to said burner means for burning in said burner means; and,
f. second transfer means coupled to said classifier to convey the granular material from said classifier means to said heating means.

2. A system according to claim 1 further including:
a. purge air introduction means coupled to said sludge drying means to introduce ambient air into said sludge drying means; and,
b. gas transfer means to convey gas from said sludge drying means to said heating means.

3. A system according to claim 2 wherein said gas transfer means includes a cyclone and a condenser.

4. A system according to claim 1 wherein said heating means is a rotary countercurrent dryer having an introduction means located at one end to introduce granular material and said burner means located at the other end.

5. A system to dry wet sludge with granular material and to burn dry sludge comprising:
a. heating and drying means to heat granular material and to mix the hot granular material with the wet sludge;
b. classifier means coupled to receive the sludge and granular material mixture from the heating and drying means and to separate the granular material from the sludge;
c. burner means coupled to receive sludge from the classifier means and coupled to the heater and dryer means to burn the dry sludge;
d. transfer means coupled to said classifier means and to said heater and dryer means to transfer granular material to the heater and dryer means; and,
e. gas removal means to remove gas from said heater and dryer means.

6. A process for drying wet sludge with granular material and burning dry sludge comprising:
a. burning dry sludge to heat the granular material in a heater;
b. transferring the hot granular material to a sludge dryer;
c. mixing the hot granular material with wet sludge in the sludge dryer to substantially dry the wet sludge;
d. transferring the mixture of granular material and substantially dry sludge to a classifier;
e. in the classifier substantially separating the dry sludge from the granular material;
f. transferring the dry sludge from the classifier to the heater to be burned; and,
g. transferring the granular material from the classifier to the heater to be heated.

7. The process of claim 6 wherein the granular material is sand.

8. The process of claim 6 wherein the dry sludge is burned at one end of the heater, and the granular material is introduced at the opposite end of the heater to flow through the heater and provide countercurrent flow of granular material and hot gas.

* * * * *